Figure 4:
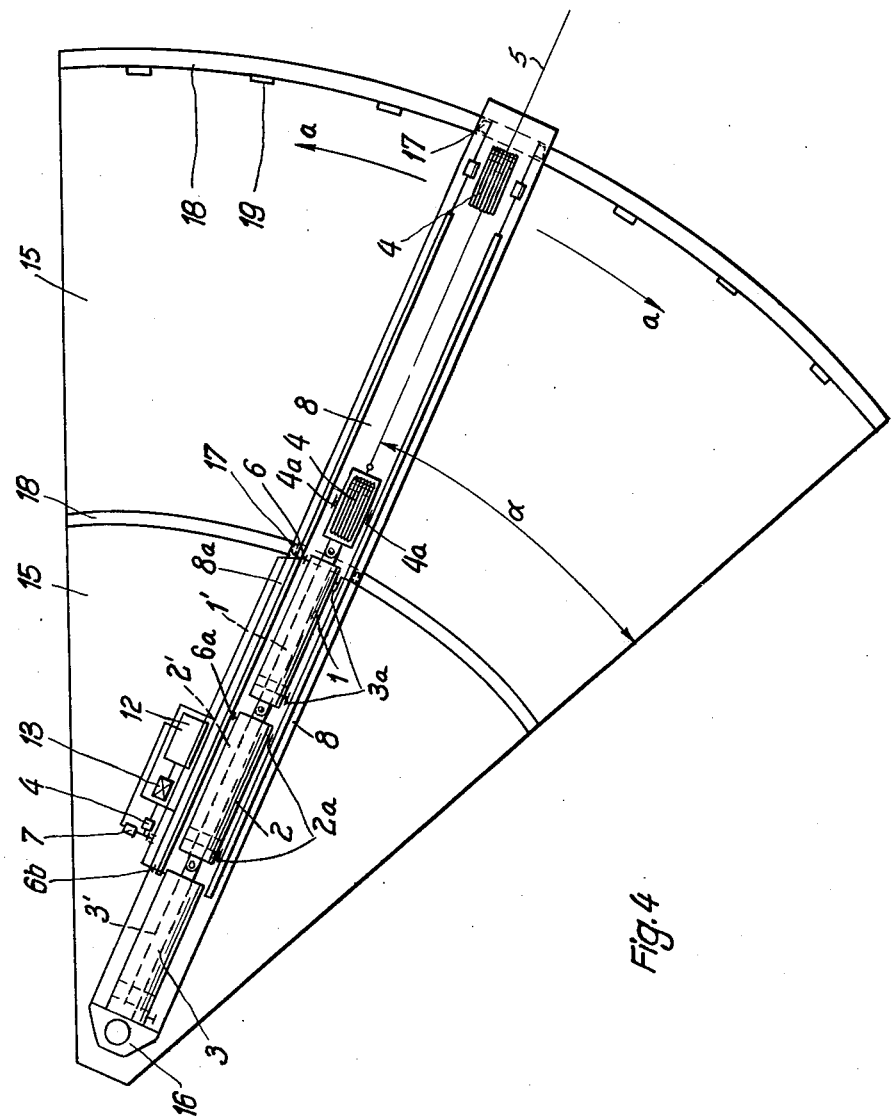

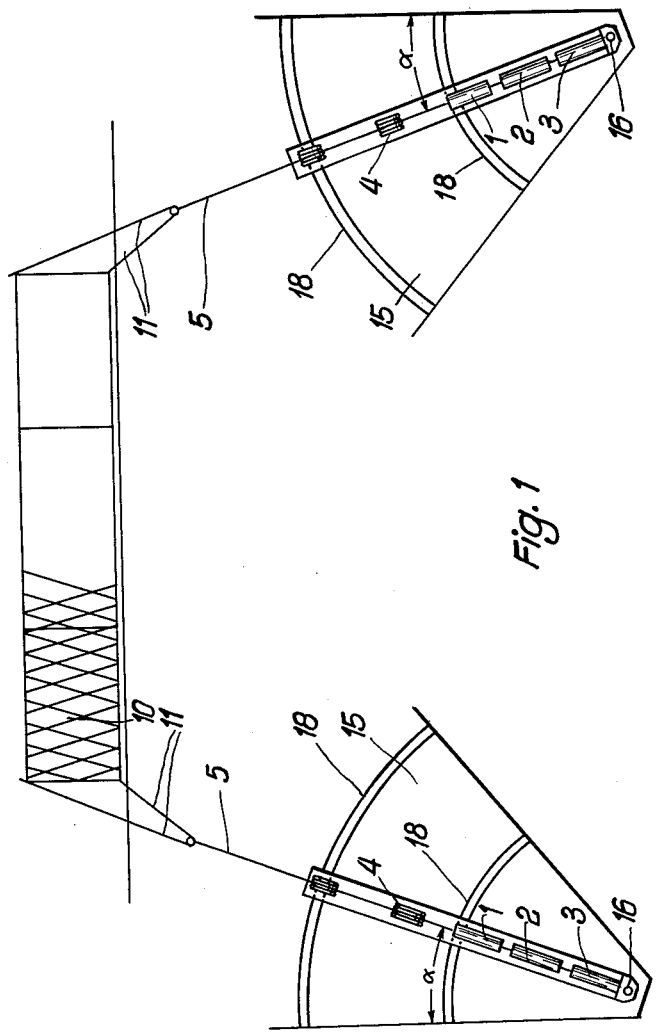

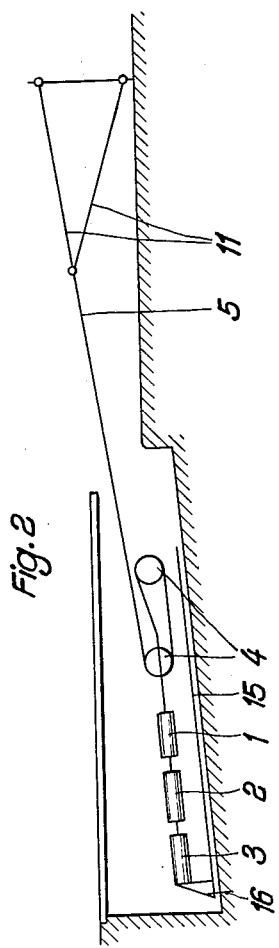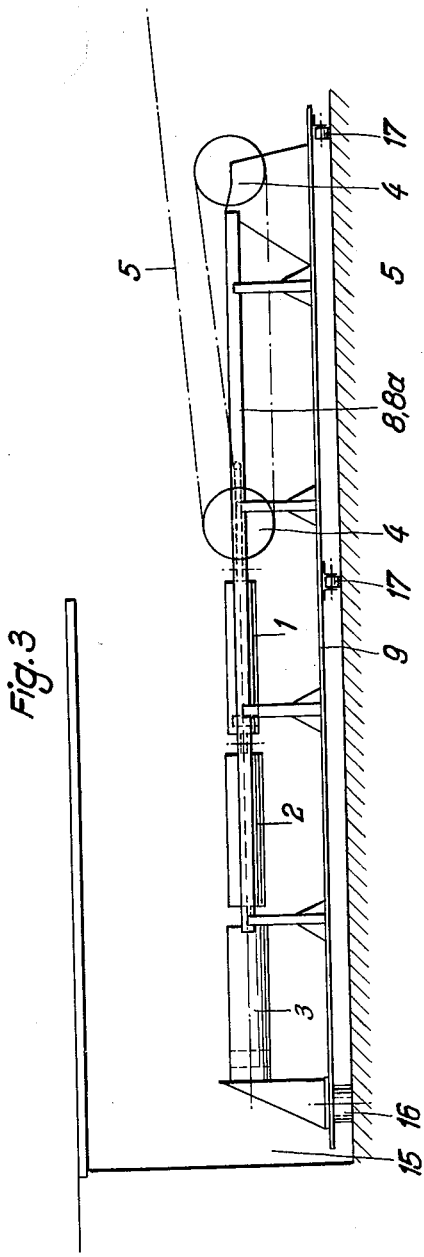

May 8, 1962     E. BAAS     3,033,498
BRAKE MEANS FOR VEHICLES, ESPECIALLY AIRPLANES
Filed Jan. 21, 1958     5 Sheets-Sheet 5
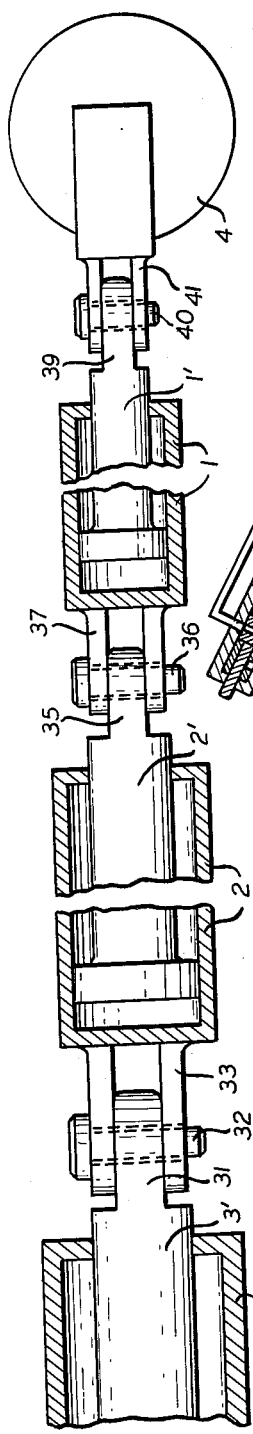
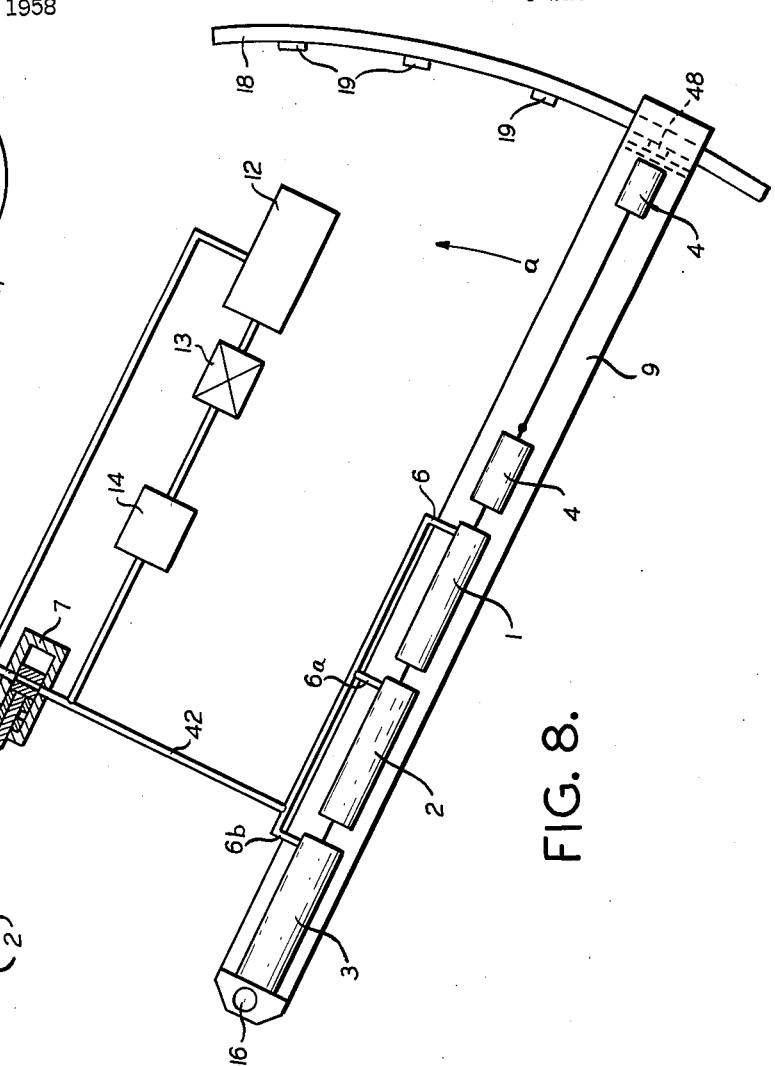
INVENTOR
ERWIN BAAS
BY
ATTORNEY.

United States Patent Office 3,033,498
Patented May 8, 1962

3,033,498
BRAKE MEANS FOR VEHICLES, ESPECIALLY AIRPLANES
Erwin Baas, Up de Schanz 66, Hamburg-Hochkamp, Germany
Filed Jan. 21, 1958, Ser. No. 710,326
Claims priority, application Germany Jan. 28, 1957
6 Claims. (Cl. 244—110)

The present invention relates to brake means in connection with a drag wire or net to retard and brake vehicles, especially air-planes which run over the end of the runway when landing.

For this purpose, it has already been proposed to load the net which is arranged at right angles to the direction of landing, at both of its end with heavy chains, which are dragged along by the vehicle running into the net. However, there is a disadvantage in so far as the airplane is subjected to considerable stress when it is slowed down suddenly. Therefore, the ends of the net have also been provided with tie ropes which are passed through a number of pistons in long, fluid- or gas-filled pipes and connected with the last piston. The pistons have overflow valves of a section which decreases in the direction of pull, and at the end of the pipes they run up one behind the other against a buffer spring. As compared with the first mentioned apparatus, this device has the advantage of a more gentle braking action. On the other hand, however, the latter design requires much more floor space and high initial cost. Furthermore, the distance necessary for an effective and gentle braking of the vehicle is comparatively long.

It is, therefore, one object of the present invention to provide a brake means for vehicles which eliminates these deficiencies in that on each side of the net or at each end of the cable hydraulic cylinders are provided one after the other, each being of different size, preferably of different diameter, and connected with a block and tackle to receive the cable which with its free end is secured to one side of the net or one end of the cable. The block and tackle is attached to the piston rod of the following hydraulic cylinder. Each of the piston rods of the following hydraulic cylinders rests against the bottom of the cylinder in front. All of the cylinders are arranged in guides on a base plate common to all of them. The fixed pulley of the block and tackle and the last hydraulic cylinder are fastened to one end each of the base plate.

It is another object of the present invention to provide a brake means for vehicles which includes automatically or manually controlled overflow valves or oil flow control valves and a pump to fill the hydraulic cylinders. On each side of the net the device is journalled on circular guide rails in a foundation to pivot sideways about a fulcrum point. Furthermore, the circular guide rails are provided with contacts for the control elements which are fitted to the laterally pivotable base plate and which enable automatic mechanical or electrical control of the overflow-valve.

It is yet another object of the present invention to provide a brake means for vehicles wherein the hydraulic working cylinder or cylinders are arranged between the pulleys of the block and tackle. In this case, the fixed pulley of the block and tackle is attached together with the cylinder bottom, to the base plate which has rails to enable the movable pulley which is connected with the piston rod to slide parallel to the cylinder axis. This arrangement enables the device to be mounted on a very small floor space.

Figure 5:
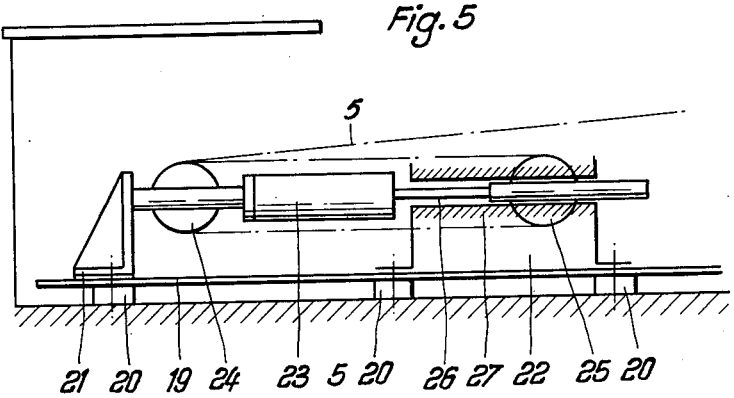
Figure 6:
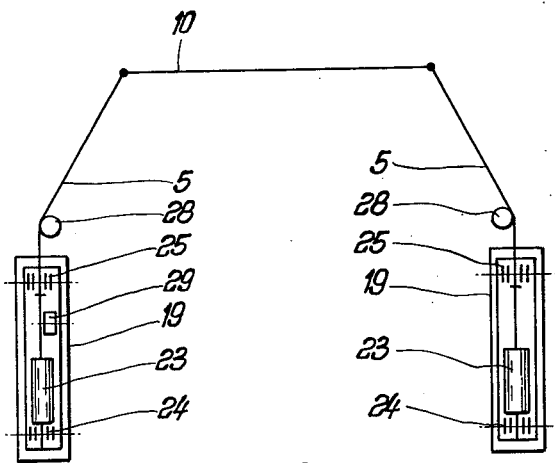

With these and other objects in view which will become apparent in the following detailed description, the present invention will be clearly understood in connection with the accompanying drawings, in which:

FIGURE 1 is a diagrammatic top plan view of the apparatus;
FIG. 2 is a side elevational view;
FIG. 3 is an enlarged side view of the hydraulic arrangement with block and tackle;
FIG. 4 is a top plan view of the arrangement illustrated in FIG. 3;
FIGS. 5 and 6 are a side view and a top plan view, respectively, of another embodiment of the present invention;
FIG. 7 is a fragmentary axial section of the connection of the piston rods with the cylinders and the block and tackle; and
FIG. 8 is an enlarged side view of the hydraulic arrangement with block and tackle disclosing the control principle of the oil flow governor.

Referring now to the drawings, and in particular to FIGS. 1 to 4, on each side of the net a drag means consisting of an apparatus comprises three single-acting hydraulic cylinders 1, 2 and 3, the effective piston area of which is increasing in the same sequence, and a block and tackle 4 on which is mounted the cable 5 and which serves to reduce the total stroke of the hydraulic cylinders 1, 2 and 3. The cylinders are filled up with oil and arranged one after the other, so that the free end of the piston rod 1' of the cylinder 1 carries the movable pulley of the block and tackle 4. The free end of the piston rod 2' of the cylinder 2 is secured to the bottom of the cylinder 1 and the free end of the piston rod 3' of the cylinder 3 is secured to the bottom of the cylinder 2. The other end of the cylinder 3 is anchored in the foundation. The pull which acts on the piston rod 1' of cylinder 1 is thus transferred to the cylinders 2 and 3. At first, the cylinder 1, having the smallest effective piston area is operated, since the three cylinders 1, 2, and 3 only come into action through means of the oil outlet lines 6, 6a, 6b (FIG. 4) and an overflow valve 7 which has been adjusted according to the force to be expected, when the excess pressure is the same in all cylinders. Due to this stepped-up formation of the cylinders 1, 2 and 3, the brake characteristic can be adapted to requirements and the sequence in which the cylinders act can be determined by a control device, if so desired. An oil flow control valve can also be fitted instead of the overflow valve 7. The brake cylinders 1, 2 and 3 and the block and tackle 4 are arranged in two guide rails 8, 8a on a base plate 9. The brake cylinder 2 is slidingly arranged between the pair of rollers 2a, the brake cylinder 1 is arranged between the pair of rollers 3a and the block and tackle 4 is disposed between the rollers 4a and 4b between the guide rails 8 and 8a. The bottom plate of the cylinder 3 is secured to one end of the base plate 9, and the fixed pulley of the block and tackle 4 is mounted at the other end of the base plate 9.

Forces which act on the net 10 are transferred, through the cables 11 and 5 to both block and tackle arrangements 4 (FIG. 1). These forces are opposed by the braking forces of the cylinders 1, 2, and 3, which are connected with the block and tackle arrangements 4.

The oil return lines 6, 6a and 6b pass the oil from the brake cylinders 1, 2 and 3 through the overflow valve 7 into an oil reservoir 12. The brake cylinders 1, 2 and 3 which have been pulled out during the braking operation, are re-filled by an oil pump 13, which on the one hand is in communication with the oil reservoir 12 and on the other hand, through a check-valve 14, with the oil lines 6, 6a and 6b, and the drawn-out cable 5 is reeled in again within a short time by extending the block and tackle 4.

The complete unit on its base plate 9 is arranged in a concrete foundation 15 and journalled to swing sideways to a certain extent about a fulcrum point 16. The base plate 9 is guided on rollers 17 on two arcuate guide rails 18 to balance the angle α which varies during the braking operation. On one of the guide rails 18 contacts 19 are provided to adjust, through means of relays, the oil flow control valve or the overflow valve 7 according to the brake pressure, as is more clearly described below. Thus, different forces acting on the brake units are counterbalanced in a certain ratio when the airplane hits the net off-center.

This adjustment of the braking forces, which increase in one brake unit and decrease in the other one, remains constant during the braking operation. Furthermore, through means of central remote control, the adjustment of the overflow valve or oil flow valve 7 is adaptable to the type of air-plane to meet any kinetic energy requirements.

In the arrangement disclosed in FIGS. 5 and 6 the base plate 19 is anchored in the soil by means of foundations 20 and provided with brackets 21 and 22. The bottom of the cylinder 23 rests against the bracket 21 in which the fixed pulley 24 of the block and tackle is journalled. The movable pulley 25 is journalled in the piston rod 26 of the hydraulic cylinder 23 and is slidable in the guide 27 of the bracket 22. The end of the cable 5 passing over the pulleys 24 and 25 engages the net or cable 10 and is passed over guide rollers 28. The latter are journalled in stationary foundations on both sides. Connected to the piston rod 26 there is a control means 29 which controls the pressure head in the cylinder 23 in dependence upon the travel of the piston (not shown).

The great advantages of the hydraulic braking system in accordance with the present invention as compared to known devices are as follows:

(1) The cylinders and the cable which are extended during the braking operation can be returned within a very short time.

(2) The angled position of the brake units relative to each other or, respectively, relative to the center line of the runway enables an adjustment of the different brake forces.

(3) No special devices or operating instructions are necessary to recover the payed-out cable.

(4) All movements are hydraulically controlled, and a fool-proof remote control is possible.

(5) The embodiment disclosed in FIGS. 5 and 6 is particularly suited for use on very small airfields or aircraft carriers because of its short, compact design.

The piston of the cylinder 1 has the smallest diameter, the piston of the cylinder 2 has a slightly larger diameter and the piston of the cylinder 3 has the largest diameter, so that the pull by the cable 5 operates at first the piston of the cylinder 1, exerting the least resistance, then the piston of the cylinder 2 and finally the piston of the cylinder 3.

Referring now again to the drawings, and in particular to FIG. 7, the connections between the brake cylinders 1, 2 and 3 and the corresponding pistons are particularly clearly shown and also the connection with the block and tackle.

The piston rod 3' of the cylinder 3 terminates into a pin 31, which is rotatably mounted by means of a bolt 32 in a bearing 33 secured to the bottom of the cylinder 2.

The piston rod 2' of the cylinder 2 terminates likewise into a pin 35 which is rotatably mounted by means of a bolt 36 in the bearing 37 secured to the bottom of the cylinder 1. Finally, the piston rod 1' of the cylinder 1 terminates likewise into a pin 39 which is rotatably mounted by means of the bolt 40 in the bearing 41 of the block and tackle 4.

Referring now again to the drawings, and in particular to FIG. 8, the function of the electrical contacts 19, which control the fluid flow through the oil-flow controller 7, is clearly set forth. FIG. 8 discloses the control principle of the oil-flow controller 7 in connection with the electric contacts.

The oil return lines 6, 6a and 6b of the brake cylinders 1, 2 and 3 communicate with the control line 42. The latter leads, on the one hand, over the oil-flow controller or over flow valve 7 to the oil reservoir 12 and, on the other hand, over a check valve 14 and the oil pump 13 again to the oil reservoir 12. Conventional means are used for operation of the oil-flow controller 7.

This device operates in the following manner:

The contacts 19 receive a predetermined basic position from the control tower of an air field by means of a relay (not shown) in accordance with the landing weight of a plane approaching the run-way. By this arrangement the oil-flow controller 7 is more or less opened or closed. The setting of the oil-flow controller 7 is brought about by means whereby the oil-flow controller 7 receives the required setting for the return flow of the oil returning from the brake cylinder. If now, for instance, a plane lands off-center and the base plate 9 swings out upon the fulcrum point 16 in the direction "a," the corresponding contact 48 engages one of the contacts 19 depending upon the position of the base plate 9, whereby the oil-flow controller 7 adjusts automatically to the oil quantities returning from the cylinders 1, 2 and 3 responsive to kinetic energies encountered.

While I have disclosed several embodiments of the present invention, it is to be understood that these embodiments are given by example only and not in a limiting sense, the scope of the present invention being determined by the objects and the claims.

I claim:

1. A device for braking the motion of a vehicle, particularly of an airplane, comprising a drag means adapted to be disposed across a runway and to be gripped by said vehicle, a base plate, a block and tackle, a cable secured to said block and tackle and leading to and connected with said drag means, said block and tackle comprising a fixed pulley secured to said base plate and a movable pulley, both said pulleys receiving said cable, said fixed pulley being disposed at the front end of said block and tackle, a plurality of hydraulic cylinders disposed in series along a common longitudinal axis, each of said cylinders having a reciprocating piston carrying a piston rod, the piston rod of the forwardmost of said hydraulic cylinders being secured to said movable pulley and to the piston rods of each of the other of said hydraulic cylinders being secured to the bottom of each corresponding adjacent hydraulic cylinder of said series, the rearmost of said hydraulic cylinders being secured to said base plate and the other of said hydraulic cylinders being axially movable relative to the rearmost of said cylinders, guide rails disposed on said base plate for longitudinal guidance of said hydraulic cylinders.

2. The device, as set forth in claim 1, wherein at least one of said hydraulic cylinders is operatively disposed between said fixed and said movable pulley of said block and tackle.

3. The device, as set forth in claim 1, which includes additional arcuate guide rails, and pivot means disposed at the rear end of said base plate and permitting turning of said hydraulic cylinders and of said block and tackle in response to the axial pull of said cable along said arcuate guide rails.

4. The device, as set forth in claim 1, which includes an oil flow control valve for said hydraulic cylinders, an oil flow line connecting said valve with said cylinders, and a pump for filling said hydraulic cylinders upon removal of oil from said cylinders during a braking operation and connected with said cylinders by means of said oil flow line.

5. The device, as set forth in claim 4, which includes additional arcuate guide rails, pivot means disposed at the rear of said base plate permitting turning of said hydraulic cylinders and of said block and tackle in response to the axial pull of said cable, said additional arcuate guide rails having a plurality of electrical contacts spaced apart from each other and adapted to control operating relays, controlling said oil flow control valve in response to the position of said base plate.

6. The device, as set forth in claim 1, which includes a guide roller for said cable disposed in front of said block and tackle, the latter being mounted on said base plate.

References Cited in the file of this patent

UNITED STATES PATENTS

| 1,802,649 | Heinkel | Apr. 28, 1931 |
| 2,151,704 | King | Mar. 28, 1939 |
| 2,783,004 | Fieux | Feb. 26, 1957 |

FOREIGN PATENTS

| 663,710 | Great Britain | Dec. 27, 1951 |